United States Patent [19]

Swearengin

[11] Patent Number: 5,601,756

[45] Date of Patent: Feb. 11, 1997

[54] LIQUID ULTRAVIOLET STABILIZER AND METHOD

[76] Inventor: John V. Swearengin, 2012 Gain Rd., El Dorado, Ark. 71730

[21] Appl. No.: 518,244

[22] Filed: Aug. 23, 1995

[51] Int. Cl.$^6$ ..................................... F21V 9/04
[52] U.S. Cl. .................. 252/589; 252/401; 252/404; 568/333
[58] Field of Search ..................... 252/589, 404, 252/401; 568/333

[56] References Cited

U.S. PATENT DOCUMENTS

| | | | |
|---|---|---|---|
| 2,853,521 | 9/1958 | Hardy et al. | 252/589 |
| 2,876,210 | 3/1959 | Wynn et al. | 252/589 |
| 2,976,259 | 3/1961 | Hardy et al. | 252/589 |
| 3,206,428 | 11/1965 | Stanley | 252/589 |
| 3,573,216 | 3/1971 | Strobel et al. | 252/589 |
| 3,575,708 | 4/1971 | Brandt et al. | 117/122 |
| 3,755,450 | 8/1973 | Anderson et al. | 260/591 |
| 3,785,827 | 1/1974 | Piller et al. | 252/589 |
| 3,892,889 | 7/1975 | Cohnen et al. | 427/160 |
| 4,093,473 | 6/1978 | Lindmayer | 136/89 P |
| 4,169,005 | 9/1979 | Fogle et al. | 156/272 |
| 4,591,608 | 5/1986 | Okinoshima | 522/13 |
| 4,595,635 | 6/1986 | Dubrow et al. | 428/447 |
| 4,894,311 | 1/1990 | Uenishi et al. | 430/192 |
| 4,999,136 | 3/1991 | Su et al. | 252/512 |
| 5,013,608 | 5/1991 | Guest et al. | 428/436 |
| 5,073,012 | 12/1991 | Lynam | 359/265 |
| 5,085,903 | 2/1992 | Kapp et al. | 428/34.6 |
| 5,115,346 | 5/1992 | Lynam | 359/604 |
| 5,212,218 | 5/1993 | Rinehart | 523/455 |
| 5,239,406 | 8/1993 | Lynam | 359/275 |
| 5,296,275 | 3/1994 | Goman et al. | 428/29 |
| 5,340,503 | 8/1994 | Varaprasad et al. | 252/583 |
| 5,377,042 | 12/1994 | Chahroudi | 359/241 |
| 5,498,345 | 3/1996 | Jollenback et al. | 252/589 |

*Primary Examiner*—James H. Reamer

[57] ABSTRACT

Liquid UV stabilizers which are stable at room temperatures or below made from di-substituted and tri-substituted benzophenone compositions. A process to render di-substituted and tri-substituted benzophenone admixtures stable liquids at room temperatures or below involving heating the admixture to a temperature in the range of 80°–175° C. for a period of time sufficient that when the admixture is cooled to room temperature the admixture remains liquid.

18 Claims, No Drawings

LIQUID ULTRAVIOLET STABILIZER AND METHOD

TECHNICAL FIELD OF THE INVENTION

This application relates to ultraviolet stabilizers and in particular, stabilizers which have been treated to make them stable in liquid form suitable for use in industrial applications.

BACKGROUND OF THE INVENTION

Ultraviolet stabilizers (also known as inhibitors or absorbers) are well-known. In the past, these ultraviolet stabilizers have been incorporated into polymeric materials in small amounts, usually less than 5% by weight to inhibit the degradation of the polymeric material when exposed to ultraviolet radiation. It has been recognized in the art that these ultraviolet stabilizers are difficult to handle in plastics compounding and plastics manufacturing processes. Many of these stabilizers were previously known to be solids at room temperature or above. Thus, in order to disperse the stabilizers uniformly throughout a product, they were many times applied as a powder or granules. Some stabilizers became tacky as the temperature increased. As a result in some manufacturing processes, the UV stabilizers which were solid at room temperature become tacky at the higher processing temperatures of some procedures. This tackiness made the UV stabilizer hard to disperse. As the temperature increased and the stabilizer became tacky, the stabilizer particles could ball together. Thus, many UV stabilizers have characteristics which rendered them difficult to utilize in the compounding of plastics.

In one aspect the present invention relates to the discovery that UV stabilizers can be rendered liquid at room temperature, and that the liquid can be rendered stable at room temperature (21°–23° C.). Further, it has been found that certain stabilizers or mixtures of stabilizers can be formed as a stable liquid down to 0° C. These liquid stabilizers have the advantages that the stabilizer is easier to use in the manufacturing of plastics or coatings because the stabilizers are in a liquid form which is easily mixed and more uniformly dispersed within the other components of the polymeric material.

Thus, the invention offers the advantages of easier manufacture, and greatly increased ease in handling.

SUMMARY OF THE INVENTION

In one aspect, the present invention relates to mixtures of di- and tri-substituted benzophenones which are liquid at temperatures of 5° C. or more lower than the reported melting points. In another aspect, the present invention relates to mixtures of di- and tri-substituted benzophenones which have been rendered liquid at temperatures of 22° C. or less for a period of two hours or more. In the preferred embodiments, the di- and tri-substituted benzophenones have the following general formula.

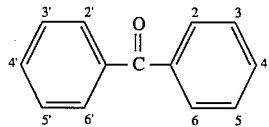

Wherein 2 is an OH, 4 is $OC_NH_{xn+1}$, and 2' is H or OH and 4' is H or $OC_nH_{2n+1}$.

In a preferred embodiment, the invention relates to a liquid UV admixture of two or more different benzophenones having the above general formula, which is liquid at 25° C.

In another aspect, the present invention relates to di- and tri-substituted benzophenones and the mixtures thereof which have been rendered stable liquids below their reported melting points and having admixed therewith one or more of the following compatible temperature reducing components: hindered amines, salicylates, cinnamates, or phosphates.

In a preferred embodiment, the invention relates an admixture of: (a) 10–60% of a first di-substituted benzophenone; (b) 10–60% of a second di-substituted benzophenone; (c) 0–45% of a tri-substituted benzophenone; (d) 0–15% of a third di-substituted benzophenone; (e) 0–15% of a fourth di-substituted benzophenone; and (f) 0–35% of a compatible temperature reducing component.

In another aspect the present invention relates to forming an admixture of one or more di-substituted or tri-substituted benzophenones with a compatible component selected from the group consisting of acrylates, phosphates, cinnamates, hindered amines, salicylates and admixtures thereof, the resulting mixture being liquid at 25° C.

In another aspect, the present invention relates to a process and a product produced by that process which is a liquified UV stabilizer. The process involves heating admixtures of different di- and tri-substituted benzophenones to a temperature in the range from about 80° C. to about 175° C. for a predetermined period of time sufficient to render the composition liquid when cooled to a temperature of 22° C. or less, cooling the mixture to 22° C. or less. In a preferred embodiment, the composition including di- and tri-substituted benzophenones is heated to a temperature in the range of 110° C.–160° C. for a period of about 1 hour or more, followed by cooling to room temperature of about 22° C. In another aspect, the invention relates to the product produced by these processes.

DETAILED DESCRIPTION

The present invention relates to liquid UV stabilizers and a method to produce liquid UV stabilizers. The liquid UV stabilizers may be produced from mixtures of benzophenones or admixtures of benzophenones with other UV stabilizers such as diphenyl acrylates, salicylates, cinnamates, and hindered amines. These mixtures may be rendered stable by liquefying the mixture at an elevated temperature and maintaining the mixture at an elevated temperature for an extended period of time. The temperature to which the mixture should be heated and the length of the time it should be maintained at that temperature can vary with the different benzophenones and the different formulation of mixtures of UV stabilizers.

The benzophenones used in the present invention are those which have an OH in either the 2 or 2' position or both, and either an oxy-alyphatic or oxo-alyphate in either the 4 or 4' position or both.

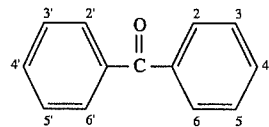

Particularly useful benzophenones have the general formula.

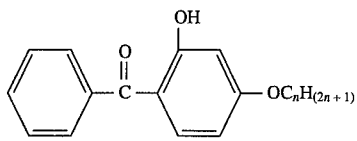

Useful benzophenones include 2-hydroxy-4-methoxy benzophenone; 2-hydroxy-4-butoxy benzophenone, 2-hydroxy-4-pentoxy benzophenone, 2-hydroxy-4-decyloxy benzophenone (2-hydroxy-4-dodecyloxy benzophenone), 2-hydroxy-4-n-octoxy benzophenone (2-hydroxy-4-octoxy benzophenone), 2-hydroxy-4-iso-octoxy benzophenone, and 2-hydroxy-4-decoxy benzophenone. It can be useful to incorporate a diphenyl acrylate to aid in obtaining a mixture which will remain liquid at a lower temperature. 2-ethylhexyl-2-cyano-3,3-diphenyl acrylate, which is commonly known as octocrylene, the formula of which is

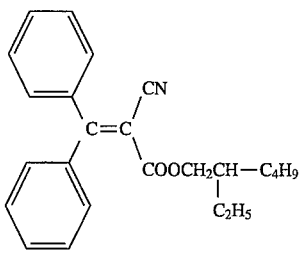

also useful is octyl salicylate which remains liquid at 0° C. having the formula:

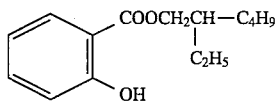

and octyl methoxy cinnamate having the formula:

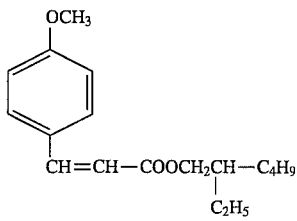

In another aspect, the invention relates to rendering a UV stabilizer and mixture of UV stabilizer liquid below the normal melting point. Stable as used in this application refers to a composition which dose not recrystallize for several hours upon being cooled below the melting point.

The present invention produces liquid ultraviolet stabilizers which are stable at useful working temperatures between about 0° C. and about 30° C. While not all of the liquid stabilizers disclosed herein are liquid throughout that entire temperature range, they are liquid in at least part of the temperature range, if not all the temperature range. Thus, they are useful in those industries where each particular composition is stable at storage and working temperatures which are within that temperature range. The liquid UV stabilizers of the present invention can be made to have different lengths of stability, i.e., time before crystal growth begins. Where the liquid stabilizers are made in the proximity of the compounding process, a stability of several hours can be sufficient. Other applications will require processing such that the liquid stabilizer remains liquid for extended periods.

The melting points reported by the manufacturers are:

| | |
|---|---|
| 2-hydroxy-4-methoxy benzophenone | 64° C. |
| 2-hydroxy-4-butoxy benzophenone | 58° C. |
| 2-hydroxy-4-pentoxy benzophenone | 56° C. |
| 2-hydroxy-4-dodecyloxy benzophenone | 52° C. |
| 2-hydroxy-4-decyloxy benzophenone | 51° C. |
| 2-hydroxy-4-n-octoxy benzophenone | 48° C. |
| 2-hydroxy-4-iso-octoxy benzophenone | ~0° C. |
| 2-hydroxy-4-decoxy benzophenone | 52° C. |
| 2,2'-dihydroxy-4-methoxy benzophenone | 74° C. |

Heat can be applied up to about 175° C., however it is generally undesirable to do so because the benzophenones discolor. Generally the benzophenones should not be heated above 160° C.

It has also been found that 2 or more benzophenones may be admixed together in appropriate ratios to produce a stable liquid admixture. When 2 benzophenones are utilized and are in a mixture, it is preferred that a first benzophenone be utilized in an amount from 40–60% by weight and that a second benzophenone in the mixture be used in an amount of 40–60% by weight. Suitable benzophenones for combination to produce a liquid stabilized admixture include 2-hydroxy-4 methoxy benzophenone; 2 hydroxy-4-n-Octoxybenzophenone; 2-hydroxy-4-iso-octoxybenzophenone; 2-hydroxy-4decoxy benzophenone; 2-hydroxy-4-butoxy benzophenone; 2-hydroxy-4-pentoxy benzophenone; and 2-hydroxy-4-dodecyloxy benzophenone. In addition, it has been found that three or more benzophenones can be admixed together to produce a stable liquid admixture which is stable at room temperature and below. When making an admixture of three or more components, each benzophenone should be present in an amount from 10–60% by weight.

Another compatible UV stabilizer which is normally liquid at room temperature below the melting point of the benzophenone can be added in varying amounts by weight of the total mixture. The compatible UV stabilizers are those which will blend with the benzophenone and can further reduce the temperature at which the benzophenone can be a stable liquid. Such additives include diphenyl acrylates and cinnamates, salicylates, and phosphates.

Admixtures of benzophenones as described above can be rendered stable liquids at room temperature and below by admixing the benzophenones in a suitable vessel, heating the benzophenone admixture until it liquifies, heating and stirring the admixture of benzophenone at a temperature above the melting point for a period of time sufficient to fuse the mixture and then cooling the mixture. These values may be easily determined by experimentation. In general, it has been found that the lower the temperature is at which the mixture is maintained while heated, the more time that is required at that temperature to produce a stable liquid when the admixture is cooled. As the temperature is elevated, less time is necessary in the heating step in order to produce a stable liquid mixture upon cooling. Preferably the heating is done under a nitrogen atmosphere in order to prevent discoloration of the benzophenone. In most applications, it is desirable to preserve the color.

A useful procedure to evaluate and determine the temperature and heating time is to heat the mixture to approximately 35° C. above the temperature where the solid benzophenone becomes liquid, maintain the temperature of the mixture and remove samples at selected time intervals such as ½ hour, 1 hour, 1.5 hours, 2 hours, 2.5 hours. These samples are then allowed to cool with continued stirring to room temperature or the temperature at which they are intended to be stored and used. The samples should be allowed to set for 2 to 12 hours at room temperature. The samples are then observed for crystal growth, solidification, or whether it is a liquid free of crystals. If all are solid, then the temperature should be elevated in an increment of 10° C. and the experiment repeated. When the cooled samples which have been at room temperature for 2 hours or more remain liquid and substantially free of crystals, then one has a baseline for temperature and time. Generally, if one increases the temperature above that baseline temperature the time of heating can be reduced. Thus, various combinations of processing temperatures and heating times can be employed with the same mixture while still producing a stable liquid admixture upon cooling. Selection of particular temperature and time for heating can/may then be made based on economic considerations. While increasing the temperature, normally allows reduction in the heating time, which generally translates into savings, energy costs and equipment costs generally increase. Thus, the present invention allows for optimization by each user.

It may also be useful to add to the benzophenone mixture from 5 to 15% of another compatible component which is normally liquid at room temperature with the UV stabilizer. Such components include: 2-ethylhexyl-2-cyano-3, 3-diphenyl acrylate. A compatible temperature reducing component is one which will form a homogenous mixture with the liquid benzophenones and will serve to help the admixture remain liquid below 25° C. Generally addition of a diphenyl acrylate can achieve further reduction in the temperature at which the benzophenone liquid will remain stable.

EXAMPLE A

Various mixtures of 2 hydroxy-4 methoxy benzophenone and 2 hydroxy-4 n-octoxy benzophenone were made in the proportions set forth in Table 1 below. The relative proportions of each ingredient were loaded into an Edenmeyer flask. The flask was set on a hot stirring plate and a thermometer inserted to monitor temperature. A light pad of nitrogen gas was maintained over sample to prevent discoloration of the samples. All samples were heated to 120° C. and held at 120° C. for one hour with stirring. All samples were cooled to 40° C. in a water bath, then allowed to cool to room temperature over night under stirring with the flask mouth stoppered. These samples were made on different days and the room temperature for the following days is recorded in Table 1. That temperature varied between 21 and 23° C.

On the following morning, the samples were observed. The condition was then recorded. Most samples were liquid as indicated by "L" in Table 1. Several samples were a combination of liquid with some crystals present as well, indicated in Table 1 as "L+C". The samples which showed both liquid and crystals were discarded. The remaining samples, which were liquid, were placed in a cold H₂O bath with the samples stirred and the temperature at which the first crystals appeared was recorded. The temperature was lowered approximately 3°–4° C. every 20 minutes. The temperature at which the first sign of crystals appeared for each sample is recorded in Table 1. It will be noted that when some samples were repeated, the crystallization temperature was slightly different. The samples were also observed to see at what temperature the material became solid. These temperatures are recorded in Table 1. Again, solidification temperatures varied slightly between repeated examples.

TABLE 1

| Sample[1] | MBZP[2] Grams | OBZP[2] Grams | Temp. Overnight | Cond. at Overnight Temp. | First Run Room Temp. of first Crys. form | Solid | Second Run Overnight Temp. | Crys. Temp. | Solid Temp. |
|---|---|---|---|---|---|---|---|---|---|
| 1 | 60 | 40 | 21° C. | L + C | — | — | 21° C. | 18° C. | 14° C. |
| 2 | 58 | 42 | 21° C. | L | 8° C. | 5° C. | 21° C. | 8° C. | 6° C. |
| 3 | 55 | 45 | 21° C. | L | 10° C. | 6° C. | 21° C. | 8° C. | 6° C. |
| 4 | 55 | 45 | 23° C. | L | 9° C. | 6° C. | 21° C. | 8° C. | 6° C. |
| 5 | 52 | 48 | 21° C. | L | 15° C. | 12° C. | 21° C. | 15° C. | 11° C. |
| 6 | 50 | 50 | 23° C. | L | 16° C. | 13° C. | 21° C. | 15° C. | 12° C. |
| 7 | 45 | 55 | 23° C. | L + C | — | — | 21° C. | — | — |

[1] = Samples not all prepared at the same time.
[2] = 2 hydroxy-4 methoxy benzophenone - 64° C.
[3] = 2 hydroxy-4 n-Octoxy benzophenone - 50° C.

The experimentation demonstrates that a mixture of 52–58 weight % methoxy benzophenone with 48–42 weight % n-Octoxy benzophenone can be liquified, and the liquid at mixture, remains stable at temperatures below 15° C. All percentages herein are weight percents unless stated otherwise.

To test long term stability, samples of a 55% methoxy benzophenone by weight and 45% octoxy benzophenone mixture was liquified. One sample was allowed to set at room temperature for one month and another sample was maintained at 10° C. for one month. The material maintained at room temperature was still liquid after one month. The mixture stored at 10° C. was predominantly liquid but a few crystals were observed in the sample. These results demonstrate that the liquified mixtures have good storage stability for industrial application.

EXAMPLE B

A mixture of 2 hydroxy-4 methoxy benzophenone, 2 hydroxy-4-n-Octoxy benzophenone and 2-ethylhexyl-2-cyano-3, 3,-diphenyl acrylate was prepared and tested for ability to liquify and for stability of liquid. The UV inhibitor 2 ethylhexyl-2cyano, 3,3-diphenyl acrylate is a liquid at room temperature. The mixture of the components was made by first preparing a mixture of 55 weight percent of 2 hydroxy-4 methoxy benzophenone with 45% by weight of 2 hydroxy 4-n-Octoxy benzophenone and heating it to 120° C. and maintaining the mixture at that temperature for one hour as discussed above in Example A. After one hour, ten weight percent (based on total of all three components) of 2 ethylhexyl-2-cyano-3, 3-diphenyl acrylate was added and stirring was continued for another 15 minutes with the mixture being held at 120° C.

The resulting mixture was cooled in an ice/H$_2$O bath to 5° C. and it was observed that the mixture became very viscous but remained liquid. Stirring was continued although the magnetic bar moves slowly through the viscous mixture. Stirring was continued for 4 hours while the sample was held at 5° C. and the mixture remained liquid after 4 hours. The mixture was then removed from the ice bath and allowed to warm up to room temperature over night. The next morning, the mixture was again placed in an ice bath and cooled to 3° C. The mixture was a viscous liquid and the magnetic bar stirring was very slow. Cooling the mixture to 2° C. the magnetic stirrer would no longer turn due to the increase viscosity of the mixture, however the mixture was still liquid.

The mixture was further cooled in an ice/salt bath and at −2° C. the mixture was still liquid. Attempts to lower the mixtures temperature further were not successful and it is believed that the mixture had insulated itself preventing further cooling. The mixture was then maintained at −2° C. for 4 hours and still no crystallization was observed. However, the material was very viscous.

The mixture was then removed from the ice bath and allowed to warm to room temperature and at 5°–6° C. the mixture could be stirred rather well, and at 10° C. the mixture thinned considerably.

The mixture was then placed in a refrigerator at 3° C. for a long term evaluation of stability. After 14 days of storage at 3° C. the mixture remained liquid.

EXAMPLE C

Next mixtures of 2hydroxy-4methoxy benzophenone and 2hydroxy-4-n-Octoxy benzophenone having the composition of samples 4 and 6 of Table 1 were made in a similar manner as described in Example A. However, the procedure of Example A was varied in that the mixtures were heated to a temperature which was kept below 90° C. at all times with a heating to temperature between 80°–85° C. for one hour. The samples were allowed to cool to room temperature and they bloomed (contained crystals) after only two hours at room temperature of 22° C.

EXAMPLE D

At mixtures having a composition of samples 4 and 6 of Table 1 were made by heating the samples to 150°–160° C. for a period of 15 minutes with stirring. The samples were then allowed to cool to room temperature and set over night. In the morning, the samples were still liquid at a room temperature of 22° C. The samples were then placed in an ice bath and allowed to cool so that appearance of first crystals could be observed. The sample having the composition of sample 6 of Table 1 showed formation of the first crystals at 18° C. and became solid at 16° C. The sample having a composition of sample 4 of Table 1 showed the first sign of crystals at 8° C. and became solid at 5° C.

EXAMPLE E

Samples were made having a composition of samples 4 and 6 of Table 1 but prepared as follows. These samples were heated to 120° C. and held at 120° C. for 15 minutes. The samples were allowed to cool to room temperature and the sample having a composition of sample 6 of Table 1 had crystals present after three hours at room temperature. The sample of the composition of sample 4 of Table 1 was still liquid at room temperature after 4 hours. This sample was allowed to stand over night and in the morning it was observed to still be liquid at room temperature of 22° C. The sample was then cooled in an ice bath as described in Example A and the sample began to crystalize at 18°–19° C. It should be noted that this crystallization temperature is approximately 10° C. higher than that observed for the samples prepared according to procedure Example A which were heated for 1 hour at 120° C.

EXAMPLE F

Two samples were prepared by admixing 55 grams 2 hydroxy-4methoxy benzophenone with 45 grams of 2 hydroxy-4-n-Octoxy benzophenone, heating the mixture to 150° C. and maintaining it at that temperature for 1 hour. Thereafter, 11 grams of octocrylene was added and stirred for 15 minutes at 120° C. to one sample. Both samples were cooled and the sample without octocrylene began to crystalize at 5° C. The other sample with octocrylene was reduced to −2° C. but no crystallization was observed, however, viscosity had increased to such a point that the magnetic bar could no longer stir the sample.

The sample with octocrylene was held at −2° C. for 2 hours and then placed in a refrigerator and maintained at 1° to 2° C. over night. This sample was still liquid in the morning. This sample was then maintained in a refrigerator at 1° to 2° C. for an extended period. The sample was still liquid over 40 days later.

EXAMPLE G

Compositions were made in accordance with the proportions set forth in Table 2. These admixtures were then heated to a temperature in the range of 150°–160° C. and held at that temperature for one hour in a nitrogen atmosphere to prevent discolorization. Thereafter, all samples were cooled to room temperature and allowed to set over night. All samples were still liquid the next day. The samples were then cooled in an ice bath and the crystallization temperature was observed as noted in Table 2.

TABLE 2

| Sample | Grams MBZP[1] | Grams of Other BZP | Crystallization Temperature |
|---|---|---|---|
| 8 | 55 | 45 DDC[2] | 11° C. |
| 9 | 55 | 45 BUT[3] | 9° C. |
| 10 | 55 | 45 DEC[4] | 11° C. |
| 11 | 55 | 45 PEN[5] | 9° C. |

[1]2hydroxy-4methoxy benzophenone 64° C.
[2]2hydroxy-4dodecyloxy benzophenone 52° C.
[3]2hydroxy-4butoxy benzophenone 58° C.
[4]2hydroxy-4decyloxy benzophenone 51° C.
[5]2hydroxy-4pentoxy benzophenone 56° C.

Samples 8, 9, 10 and 11 were then reheated to 150° C. to liquify them and 11 grams of octocrylene was added to each sample, the sample was stirred and held at 150° C. for 15 minutes. These samples were then cooled to room temperature and then to 0° C. in an ice bath. All samples remain liquid at 0° C. They were maintained in the ice bath for 2 hours and they still remain liquid after 2 hours.

The samples with the added octocrylene were then divided into a number of small 5 ml vials and sealed. The vials were refrigerated to test long term stability and were maintained at 1°–2° C. The samples were checked 13 days later and all remained liquid at 2° C. The samples were replaced in a refrigerator and checked again at 45 days and all remained liquid at 2° C.

EXAMPLE H

Samples were made utilizing the compositions set forth in Table 3. The compositions were heated to 150°–160° C. and maintained at that temperature for 1 hour. They were heated under a nitrogen atmosphere in order to prevent discoloring. All samples were cooled to room temperature and were liquid at room temperature. The following days the samples were placed in ice baths and cooled as described above and the temperature at which crystallization took place was observed. This recrystallization temperature is recorded in Table 3.

TABLE 3

| Sample | Grams - Part 1 | Grams - Part 2 | Crystalline Temperature |
| --- | --- | --- | --- |
| 12 | 50 OBZP[1] | 50 DDC | 14° C. |
| 13 | 50 OBZP | 50 BUT[3] | 14° C. |
| 14 | 50 DDC[2] | 50 BUT | 12° C. |

[1]OBZP = 2hydroxy-4-n-octoxy benzophenone
[2]DBZP = 2hydroxy-4dodeclyoxy benzophenone
[3]BBZP = 2hydroxy-4butoxy benzophenone Samples 12, 13 and 14 were then removed from the ice bath and remelted at 150° C. and 11 grams of octocrylene was added to each sample with stirring and with temperature being held at 150° C. for 15 minutes. These samples were cooled to room temperature and then placed in a ice and salt bath. Temperature was lowered and no samples showed crystallization at 0° C. The samples were maintained in the ice bath for 4 hours and still showed no signs of crystallization.

EXAMPLE I

Samples were made utilizing dissimilar di-substituted benzophenones. Samples having a composition set forth in Table 4 were prepared by mixing the samples and heating them under a nitrogen atmosphere to a temperature about 150°–160° C. for 1 hour. Thereafter the samples were cooled to 20° C. and held at 20° C. for 1 hour. None of the samples crystallized and were easily pourable and stirrable. The samples were then cooled to 5° C. and no crystallization was observed but the samples had become viscous enough that they could not be stirred with a magnetic stirring bar. The samples were then cooled to 1° C. and held there at 4 hours with no crystallization.

TABLE 4

| Sample | Grams - Part 1 | Grams - Part 2 |
| --- | --- | --- |
| 15 | 55 IOBZP[1] | 45 MBZP[2] |
| 16 | 55 IOBZP | 45 BBZP[3] |
| 17 | 55 IOBZP | 45 DBZP[4] |

[1]IOBZP = 2hydroxy-4isoOctoxybenzophenone
[2]MBZP = 2hydroxy-4methoxybenzophenone
[3]BBZP = 2hydroxy-4butoxybenzophenone
[4]DBZP = 2hydroxy-4dodecyloxybenzophenone These results demonstrate that no additives such as octocrylene need be added to achieve a stable liquid at 0° C. if the 2 hydroxy-4-iso-Octoxy benzophenone is used instead of 2 hydroxy-4-n-Octoxy benzophenone.

EXAMPLE J

Compositions were made having the proportions set forth in Table 5. These were prepared by heating the mixture under a nitrogen atmosphere to a temperature in the range of 150°–160° C. and maintaining it at that temperature for 1 hour with stirring. Thereafter, the samples were cooled to 20° C. and held at that temperature for 2 hours. At the end of 2 hours no crystallization was observed.

The samples were then further cooled to 5° C. and held at 5° C. for 2 hours and no crystallization was observed. Portions from each sample were put into a 5ml vial and refrigerated at 2°–3° C. and held over night. No crystallization was observed the next day. The samples were returned to the refrigerator and held at 2° to 3° C. for 3 more days and again upon inspection, no crystallization was observed in any sample.

TABLE 5

| Sample | Grams-Part 1 | Grams-Part 2 | Grams-Part 3 | Grams-Part 4 | Grams-Part 5 | Grams-Part 6 |
| --- | --- | --- | --- | --- | --- | --- |
| 18 | 55 MBZP[a] | 30nOBZP[2] | 15DDBZP[3] | — | — | — |
| 19 | 55 MBZP | 25nOBZP | 10DDBZP | 10isoOBZP[4] | — | — |
| 20 | 50 MBZP | 10nOBZP | 10DBZP[5] | 10DDBZP | 20isoOBZP | — |
| 21 | 20 MBZP | 20DDBZP | 10nOBZP | 25isoOBZP | 10DBZP | 15OCT[6] |

[1]MBZP = 2hydroxy-4methoxybenzophenone
[2]nOBZP = 2hydroxy-4nOctoxybenzophenone
[3]DDBZP = 2hydroxy-4dodecyloxybenzophenone
[4]isoOBZP = 2hydroxy-4isoOctoxybenzophenone
[5]DBZP = 2hydroxy-4decyloxybenzophenone [check]
[6]OCT = octocrylene

EXAMPLE K

Tri-substituted benzophenones may also be employed in the invention. Two samples were made. The first was made of 40 grams 2 hydroxy-4-methoxy benzophenone, 40 grams 2 hydroxy-4-iso-octoxy benzophenone; and 20 grams 2, 2'-dihydroxy-4-methoxy benzophenone. The second sample was made of 55 grams 2 hydroxy-4-methoxy benzophenone; 25 grams 2 hydroxy-4-n-octoxy benzophenone; 45 grams 2,2'-dihydroxy-4-methoxy benzophenone and 25 grams octocrylene.

Both samples were heated to 150° C. and held there for 1 hour under a nitrogen atmosphere. The samples were cooled to room temperature. Both samples were liquid, and remained liquid after 2 hours at room temperature. The samples were then cooled to 5° C. and remained liquid. The samples were held for two hours at 5° and remained a liquid. A 5 milliliter portion of each sample was placed in a refrigerator overnight and were still liquid in the morning.

EXAMPLE L

A composition was made to determine if antioxidants could be used with the liquified stabilizers. Two samples were prepared. The first was 35 grams of 2 hydroxy-4-methoxy benzophenone, 25 grams 2 hydroxy-4-n-octoxy benzophenone and 40 grams of tris (nonyl phenyl) phosphite. The second sample was 35 grams 2 hydroxy-4-n-octoxy benzophenone, 35 grams 2 hydroxy, 4-dodecyloxy benzophenone and 30 grams of tris (nonyl phenyl) phosphite.

Both samples were prepared by mixing the benzophenones at 150° C. for 1 hour, and then adding to the mix the antioxidant, tris (nonyl phenyl) phosphite. The samples were then cooled to room temperature without any crystallization. The samples were cooled to 5° C. and held there for 2 hours without crystallization. Small portions of each sample were refrigerated and remained liquid for at least 2 weeks.

EXAMPLE M

In this example, light stabilizers were blended with the liquid stabilizers. The compositions are set froth in Table 6. The compositions were made by first mixing the benzophenones and heating them to 150° C. for one hour under nitrogen atmosphere. The benzophenone was cooled to 80° C. and the benzotriazole or kindred amine was added, and the resulting admixture was stirred for 15 minutes at 80° C.

TABLE 6

| Sample | MBZP[1] Grams | OBZP[2] Grams | Additive Grams | Additive |
|---|---|---|---|---|
| 22 | 55 | 45 | 33.3 | Bis(2,2,6,6, tetramethyl-4 piperidinyl decane dioate) |
| 23 | 55 | 45 | 33.3 | Bis(1,2,2,6,6, pentamethyl-4 piperidinyl) sebacate |
| 24 | 55 | 45 | 33.3 | Poly (oxy-1,2-ethanediyl), alpha[3-[3-(2H-benzotriazol-2-yl)-5-(1,1-benzotriazone)] |

[1]2 hydroxy-4-methoxy benzophenone
[2]2 hydroxy-4-octoxy benzophenone

The samples were cooled at room temperature and remained liquid. A 5 millimeter portion of each sample was placed in a refrigerator at 1°–2° C. for 7 days and remained liquid. No crystallization was observed after 7 days.

Additional samples were prepared in the same manner as described above, except that the amount of additive included was 49 grams (33% of the total weight) rather than 33 grams. Upon cooling to room temperature, the samples were liquid. Portions of each sample were placed in a refrigerator at 1°–2° C. for 7 days. At the end of 7 days the samples were still liquid and no crystallization was observed.

EXAMPLE N

A mixture of 50 grams of 2 hydroxy-4-methoxy benzophenone and 75 grams of octyl salicylate where heated with stirring under a nitrogen pad to 120° C. The mixture was maintained at temperatures with stirring for 1 hour. The admixture was cooled to 5° C. and held at that temperature for 4 hours, and no crystallization was observed after 4 hours.

EXAMPLE O

A mixture of 50 grams of 2 hydroxy-4-methoxy benzophenone and 75 grams of octyl methoxy cinnamate were heated with stirring to 120° C. and maintained at that temperature 1 hour. The liquid was cooled to 5° C. and at that temperature for 4 hours with no crystallization being observed.

Preferred compositions of the present invention include the following admixtures:

a. 40–60 weight percent of 2 hydroxy-4methoxy benzophenone with 40–60 weight percent of 2 hydroxy-4-n-Octoxy benzophenone;

b. 40–60 weight percent of a first di-substituted benzophenone with 40–60 percent of a second di-substituted benzophenone;

c. 40–60 weight percent of a first di-substituted benzophenone, 40–60 weight percent of a second di-substituted of a benzophenone and 5–15% of a compatible material which is normally liquid at room temperature;

d. 10–60 weight percent of a first di-substituted benzophenone, 10–35 weight percent of a second di-substituted benzophenone, 5–15% of a third di-substituted benzophenone and 5–15% of a fourth di-substituted benzophenone. Preferably the benzophenone present in the largest percentage is 2hydroxy-4methoxybenzophenone.

e. 5–20% of 2hydroxy-4-iso-octoxy benzophenone, 40–60% of a first di-substituted benzophenone and 40–60% of a second di-substituted benzophenone.

While the invention has been described in terms of the preferred embodiments, variations of the invention will be readily apparent to those skilled in the art.

I claim:

1. A UV stabilizer comprising an admixture of two or more different benzophenones having the general formula of:

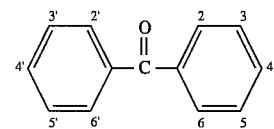

wherein 2 is OH, 2' is H or OH, 4 is $OC_nH_{2n+1}$ and 4' is H or $OC_nH_{2n+1}$, said admixture being liquid at 22° C.

2. The composition of claim 1 wherein said benzophenones are selected from the group consisting of 2 hydroxy-4methoxy benzophenone, 2 hydroxy 4-n-octoxy benzophenone, 2 hydroxy-4dodecyloxy benzophenone, or 2,2-dihydroxy-4-methoxy benzophenone.

3. A UV liquid stabilizer comprising an admixture of:

(a) 30–60 weight percent of a first di-substituted benzophenone having the general formula of:

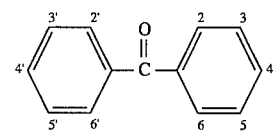

wherein 2 is OH, 2' is H or OH, 4 is $OC_nH_{2n+1}$ and 4' is H or $OC_nH_{2n+1}$; and (b) 30–60 weight percent of a second di-substituted benzophenone having the general formula of:

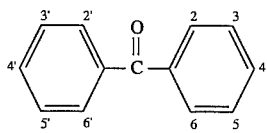

wherein 2 is OH, 2' is H or OH, 4 is $OC_nH_{2n+1}$ and 4' is H or $OC_nH_{2n+1}$; and (c) 0–45 weight percent of a tri-substituted benzophenone having the general formula of:

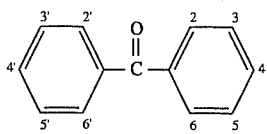

wherein 2 is OH, 2' is H or OH, 4 is $OC_nH_{2n+1}$ and 4' is H or $OC_nH_{2n+1}$; and (d) 0–35 weight percent of a compatible component, said admixture being a liquid at 25° C.

4. The composition of claim 3 wherein said first and second benzophenones are selected from the group consisting of 2hydroxy-4methoxy benzophenone, 2hydroxy-4-butoxy benzophenone 2hydroxy-4-n-octoxybenzophenone, 2hydroxy-4dodecyl benzophenone, 2hydroxy-4-iso-octoxy benzophenone, 2hydroxy-4decoxy benzophenone, and 2hydroxy-4-pentoxy benzophenone.

5. The composition of claim 4 wherein said compatible component is selected from the group consisting of hindered amines, salicylates, diphenyl acrylates, cinnamates or admixtures thereof.

6. The composition of claim 5 wherein said tri-substituted benzophenone is 2,2-dihydroxy-4-methoxy benzophenone.

7. The composition of claim 4 wherein said compatible component is selected from the group consisting of 2-ethylhexyl-2-cyano-3,3-diphenyl acrylate; octyl methoxy cinnamate; octyl salicylate; tris (nonyl phenyl) phosphite; bis (2,2,6,6 tetramethyl-4 piperidinyl decane dioate; bis (1,2,2, 6,6, pentamethyl-4-piperidinyl) sebacate; poly (oxy- 1,2-ethanedryl), alpha [3-[3-(2H-benzo triazol-2-yl)-5(1,1-benzo triazone)] or mixtures thereof.

8. A UV stabilizer composition comprising:

(a) 10–60 weight percent of the first di-substituted benzophenone;

(b) 10–40 weight percent of a second di-substituted benzophenone;

(c) 5–15 percent of a third di-substituted benzophenone; and (d) 5–15 percent of a fourth di-substituted benzophenone, said admixture being a liquid at 25° C.

9. A process for rendering an admixture of benzophenones liquid below 25° C. comprising:

(a) admixing two or more benzophenones of the following general formula:

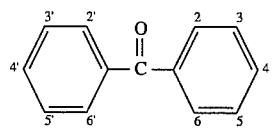

wherein 2 is OH, 2' is H or OH, 4 $OC_nH_{2n+1}$ and 4' is H or $OC_nH_{2n+1}$; and (b) heating the admixture in the range of 80° C. to 175° C. to liquify the admixture;

(c) maintaining the admixture at a temperature in the range of 80° C. to 175° C. for a predetermined time such that when the admixture is cooled it will remain liquid at 25° C. for 2 hours.

10. The process of claim 9 further comprising the step of adding to the heated admixture a compatible component selected from the group consisting of acrylates, salicylates, cinnamates, phosphates or admixtures thereof.

11. A liquid UV stabilizer comprising:

(a) one or more di-substituted or tri-substituted benzophenone having the general formula:

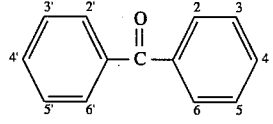

wherein 2 is OH, 2' is H or OH, 4 is $OC_nH_{2n+1}$ and 4' is H or $OC_nH_{2n+1}$.

(b) a compatible component selected from the group consisting of acrylates, phosphates, salicylates, hindered amines, cinnamates or mixtures thereof, said composition being liquid at 25° C.

12. The stabilizer of claim 1 wherein the liquid admixture has the characteristic that it would be stable for about 2 hours or more at 22° C.

13. The stabilizer of claim 2 wherein the liquid admixture has the characteristics that it would be stable for about 2 hours or more at 22° C.

14. The stabilizer of claim 3 wherein the liquid admixture has the characteristics that it would be stable for about 2 hours or more at 25° C.

15. The stabilizer of claim 5 wherein the liquid admixture has the characteristics that it would be stable for about 2 hours or more at 25° C.

16. The stabilizer of claim 6 wherein the liquid admixture has the characteristics that it would be stable for about 2 hours or more at 25° C.

17. The stabilizer of claim 7 wherein the liquid admixture has the characteristics that it would be stable for about 2 hours or more at 25° C.

18. The stabilizer of claim 8 wherein the liquid admixture has the characteristics that it would be stable for about 2 hours or more at 25° C.

* * * * *

UNITED STATES PATENT AND TRADEMARK OFFICE
CERTIFICATE OF CORRECTION

PATENT NO. : 5,601,756

DATED : February 11, 1997

INVENTOR(S) : Swearengin

Page 1 of 2

It is certified that error appears in the above-indentified patent and that said Letters Patent is hereby corrected as shown below:

Col. 3, line 58, delete "dose", insert --does--.

Col. 4, line 28, delete "toxybenzophenone", insert --toxy benzophenone--, and delete "2-hydroxy-4-iso-octoxybenzophenone;", insert therefor --2-hydroxy-4-iso-octoxy benzophenone;--.

Col. 5, line 19, after "temperature", delete "," and after "time" delete ",".

Col. 7, line 25, delete "mixtures", insert --mixture's--.

Col. 7, line 31, delete "temperature and at", insert --temperature. At--.

Col. 7, line 40, after "Next", insert --,--.

Col. 7, line 52, delete "At mixtures", insert --Mixtures--.

Col. 11, line 26, delete "froth", insert --forth--.

UNITED STATES PATENT AND TRADEMARK OFFICE
CERTIFICATE OF CORRECTION

PATENT NO. : 5,601,756
DATED : February 11, 1997
INVENTOR(S) : Swearengin

It is certified that error appears in the above-indentified patent and that said Letters Patent is hereby corrected as shown below:

Table 1, third column, delete "$OBZP^2$", insert --$OBZP^3$--.
Col. 7, line 1, delete "hydroxy -4", insert --hydroxy-4--.
Table 5, second column for Sample 18, delete "55 $MBZP^a$", insert --55 $MBZP^1$--.
Col. 14, line 8, after the first "4", insert --is--.

Signed and Sealed this

Twenty-sixth Day of August, 1997

Attest:

BRUCE LEHMAN

Attesting Officer

Commissioner of Patents and Trademarks